United States Patent
Biagioli et al.

(10) Patent No.: US 11,174,792 B2
(45) Date of Patent: Nov. 16, 2021

(54) SYSTEM AND METHOD FOR HIGH FREQUENCY ACOUSTIC DAMPERS WITH BAFFLES

(71) Applicant: General Electric Company, Schenectady, NY (US)

(72) Inventors: Fernando Biagioli, Aargau (CH); Nikola Vranjic, Zagreb (HR); Philipp Brunner, Aargau (CH); Felipe Bolanos, Lucerne (CH); Dariusz Oliwiusz Palys, Aargau (CH)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 169 days.

(21) Appl. No.: 16/418,418

(22) Filed: May 21, 2019

(65) Prior Publication Data
US 2020/0370477 A1    Nov. 26, 2020

(51) Int. Cl.
*F02C 7/24*    (2006.01)
*F02C 7/12*    (2006.01)

(52) U.S. Cl.
CPC .................. *F02C 7/24* (2013.01); *F02C 7/12* (2013.01); *F05D 2260/963* (2013.01); *F23R 2900/00014* (2013.01)

(58) Field of Classification Search
CPC .............. F02C 7/24; F23R 2900/00014; F05D 2260/963; F05D 2260/964; G10K 2210/107
See application file for complete search history.

(56) References Cited

U.S. PATENT DOCUMENTS

| | | | |
|---|---|---|---|
| 5,791,148 | A | 8/1998 | Burrus |
| 5,797,267 | A | 8/1998 | Richards |
| 5,802,854 | A | 9/1998 | Maeda et al. |
| 5,806,299 | A | 9/1998 | Bauermeister et al. |
| 5,826,429 | A | 10/1998 | Beebe et al. |
| 5,836,164 | A | 11/1998 | Tsukahara et al. |
| 5,916,126 | A | 6/1999 | Szillat et al. |

(Continued)

FOREIGN PATENT DOCUMENTS

| | | | |
|---|---|---|---|
| EP | 602901 B1 | 3/1998 | |
| EP | 656512 B1 | 8/1998 | |

(Continued)

OTHER PUBLICATIONS

European Search Report for Application No. EP20175293 dated Sep. 22, 2020; 1 p.

*Primary Examiner* — Gerald L Sung
(74) *Attorney, Agent, or Firm* — Armstrong Teasdale LLP (57) ABSTRACT

A rotary machine includes at least one burner including a front panel having a front side and an opposing back side. The acoustic damper includes at least one wall, at least one cooling air inlet, at least one outlet, and at least one baffle. The wall extends from the back side of the front panel and defines a dampening chamber. The cooling air inlet is defined within the back side of the front panel and is configured to channel a flow of cooling air into the dampening chamber. The outlet is defined within the back side of the front panel and is configured to channel the flow of cooling air out of the dampening chamber. The baffle extends from the back side of the front panel and is configured to reduce a velocity of the flow of cooling air within the dampening chamber.

19 Claims, 6 Drawing Sheets

(56) References Cited

U.S. PATENT DOCUMENTS

| | | | |
|---|---|---|---|
| 5,983,643 A | 11/1999 | Kiesow | |
| 6,056,538 A | 5/2000 | Buchner et al. | |
| 6,094,916 A | 8/2000 | Puri et al. | |
| 6,148,604 A | 11/2000 | Salt et al. | |
| 6,192,688 B1 | 2/2001 | Beebe | |
| 6,201,029 B1 | 3/2001 | Waycuilis | |
| 6,220,034 B1 | 4/2001 | Mowill | |
| 6,311,471 B1 | 11/2001 | Waldherr et al. | |
| 6,351,947 B1 * | 3/2002 | Keller .................. | F23R 3/002 60/725 |
| 6,370,863 B2 | 4/2002 | Muller et al. | |
| 6,381,947 B2 | 5/2002 | Emmons | |
| 6,389,815 B1 | 5/2002 | Hura et al. | |
| 6,412,282 B1 | 7/2002 | Willis | |
| 6,513,334 B2 | 2/2003 | Varney | |
| 6,535,124 B1 | 3/2003 | DiTommaso et al. | |
| 6,543,231 B2 | 4/2003 | Stuttaford et al. | |
| 6,546,729 B2 | 4/2003 | Hellat et al. | |
| 6,558,154 B2 | 5/2003 | Eroglu et al. | |
| 6,609,376 B2 | 8/2003 | Rokke | |
| 6,691,515 B2 | 2/2004 | Verdouw et al. | |
| 6,691,518 B2 | 2/2004 | Doebbeling et al. | |
| 6,694,745 B2 | 2/2004 | Stalder et al. | |
| 6,698,209 B1 | 3/2004 | Gutmark et al. | |
| 6,735,949 B1 | 5/2004 | Haynes et al. | |
| 6,742,341 B2 | 6/2004 | Ryan et al. | |
| 6,758,045 B2 | 7/2004 | Dimov et al. | |
| 6,837,052 B2 | 1/2005 | Martling | |
| 6,959,536 B1 | 11/2005 | Maher | |
| 6,962,055 B2 | 11/2005 | Chen et al. | |
| 6,966,186 B2 | 11/2005 | Bachovchin et al. | |
| 6,981,358 B2 | 1/2006 | Bellucci et al. | |
| 7,003,939 B1 | 2/2006 | Rackwitz et al. | |
| 7,065,971 B2 | 6/2006 | Bellucci et al. | |
| 7,104,065 B2 | 9/2006 | Benz et al. | |
| 7,137,242 B2 | 11/2006 | Griffiths | |
| 7,162,874 B2 | 1/2007 | Mowill | |
| 7,162,875 B2 | 1/2007 | Fletcher et al. | |
| 7,331,182 B2 | 2/2008 | Graf et al. | |
| 7,413,053 B2 | 8/2008 | Wasif et al. | |
| 7,462,220 B2 | 12/2008 | Farmer | |
| 7,464,552 B2 | 12/2008 | Sattinger | |
| 7,484,352 B2 | 2/2009 | Flohr et al. | |
| 7,503,178 B2 | 3/2009 | Bucker et al. | |
| 7,513,117 B2 | 4/2009 | Garay et al. | |
| 7,827,777 B2 | 11/2010 | Eroglu et al. | |
| 7,857,094 B2 | 12/2010 | Macquisten et al. | |
| 7,878,799 B2 | 2/2011 | Flohr et al. | |
| 7,901,203 B2 | 3/2011 | Ni et al. | |
| 8,001,761 B2 | 8/2011 | Myers, Jr. et al. | |
| 8,230,688 B2 | 7/2012 | Wilson et al. | |
| 8,239,114 B2 | 8/2012 | Goeke et al. | |
| 8,375,726 B2 | 2/2013 | Wiebe et al. | |
| 8,387,398 B2 | 3/2013 | Martin et al. | |
| 8,434,311 B2 | 5/2013 | Zhang et al. | |
| 8,459,985 B2 | 6/2013 | Carroni et al. | |
| 8,561,409 B2 | 10/2013 | Milosavljevic | |
| 8,635,874 B2 | 1/2014 | Eroglu et al. | |
| 8,683,808 B2 | 4/2014 | Venkataraman et al. | |
| 8,689,562 B2 | 4/2014 | Kendrick | |
| 8,701,382 B2 | 4/2014 | Davis, Jr. et al. | |
| 8,701,418 B2 | 4/2014 | Venkataraman et al. | |
| 8,707,707 B2 | 4/2014 | Venkataraman et al. | |
| 8,713,943 B2 | 5/2014 | Poyyapakkam et al. | |
| 8,720,206 B2 | 5/2014 | McMahan et al. | |
| 8,776,524 B2 | 7/2014 | Kreutle et al. | |
| 8,783,042 B2 | 7/2014 | Garay et al. | |
| 8,806,873 B2 | 8/2014 | Schell et al. | |
| 8,863,523 B2 | 10/2014 | Chen | |
| 8,863,524 B2 | 10/2014 | Karlsson et al. | |
| 8,881,531 B2 | 11/2014 | Scarinci et al. | |
| 8,899,048 B2 | 12/2014 | Prociw et al. | |
| 8,919,125 B2 | 12/2014 | Belsom et al. | |
| 8,931,589 B2 | 1/2015 | Bothien et al. | |
| 8,984,888 B2 | 3/2015 | Uhm et al. | |
| 8,991,185 B2 | 3/2015 | Huber et al. | |
| 8,991,192 B2 | 3/2015 | Wiebe et al. | |
| 9,003,804 B2 | 4/2015 | Prociw | |
| 9,010,120 B2 | 4/2015 | DiCintio et al. | |
| 9,028,247 B2 | 5/2015 | Siewert et al. | |
| 9,052,114 B1 | 6/2015 | Toqan et al. | |
| 9,062,886 B2 | 6/2015 | De La Cruz Garcia et al. | |
| 9,068,512 B2 | 6/2015 | Zinn et al. | |
| 9,091,446 B1 | 7/2015 | Toqan et al. | |
| 9,097,185 B2 | 8/2015 | Demougeot et al. | |
| 9,097,426 B2 | 8/2015 | Engelbrecht et al. | |
| 9,163,840 B2 | 10/2015 | Yoshida et al. | |
| 9,170,023 B2 | 10/2015 | Guethe et al. | |
| 9,228,499 B2 | 1/2016 | Stryapunin | |
| 9,243,507 B2 | 1/2016 | Stoia et al. | |
| 9,249,689 B2 | 2/2016 | Hellat et al. | |
| 9,249,979 B2 | 2/2016 | Zajadatz et al. | |
| 9,255,527 B2 | 2/2016 | Thornton et al. | |
| 9,261,278 B2 | 2/2016 | Bothien et al. | |
| 9,279,364 B2 | 3/2016 | Hamrin et al. | |
| 9,285,123 B2 | 3/2016 | Garay et al. | |
| 9,303,872 B2 | 4/2016 | Hadley et al. | |
| 9,310,078 B2 | 4/2016 | Chen et al. | |
| 9,322,558 B2 | 4/2016 | Ramier et al. | |
| 9,334,808 B2 | 5/2016 | Abe et al. | |
| 9,366,443 B2 | 6/2016 | Laster et al. | |
| 9,383,104 B2 | 7/2016 | Melton et al. | |
| 9,388,745 B2 | 7/2016 | Bothien et al. | |
| 9,400,113 B2 | 7/2016 | Ogata et al. | |
| 9,404,659 B2 | 8/2016 | Melton et al. | |
| 9,416,972 B2 | 8/2016 | Hawie et al. | |
| 9,429,032 B2 | 8/2016 | Bothien et al. | |
| 9,435,541 B2 | 9/2016 | Davis, Jr. et al. | |
| 9,453,461 B2 | 9/2016 | Patel et al. | |
| 9,464,809 B2 | 10/2016 | Abe et al. | |
| 9,482,106 B2 | 11/2016 | DUsing et al. | |
| 9,482,434 B2 | 11/2016 | Davis, Jr. et al. | |
| 9,494,321 B2 | 11/2016 | Melton et al. | |
| 9,518,743 B2 | 12/2016 | Eroglu | |
| 9,534,789 B2 | 1/2017 | Scarinci | |
| 9,551,490 B2 | 1/2017 | DiCintio et al. | |
| 9,551,491 B2 | 1/2017 | Eroglu et al. | |
| 9,551,492 B2 | 1/2017 | Haynes et al. | |
| 9,581,088 B2 | 2/2017 | Qin et al. | |
| 9,599,022 B2 | 3/2017 | Stastny et al. | |
| 9,599,028 B2 | 3/2017 | Shinkle et al. | |
| 9,618,206 B2 | 4/2017 | Genin et al. | |
| 9,624,830 B2 | 4/2017 | Ferreira-Providakis et al. | |
| 9,625,154 B2 | 4/2017 | Benz et al. | |
| 9,683,744 B2 | 6/2017 | Patel et al. | |
| 9,708,983 B2 | 7/2017 | Eroglu et al. | |
| 9,709,278 B2 | 7/2017 | Crothers et al. | |
| 9,714,768 B2 | 7/2017 | Davis, Jr. et al. | |
| 9,726,085 B2 | 8/2017 | Lipari et al. | |
| 9,765,975 B2 | 9/2017 | KnOpfel et al. | |
| 9,810,152 B2 | 11/2017 | Genin et al. | |
| 9,810,160 B2 | 11/2017 | Lang et al. | |
| 9,816,708 B2 | 11/2017 | Bothien et al. | |
| 9,828,912 B2 | 11/2017 | De La Cruz Garcia et al. | |
| 9,829,200 B2 | 11/2017 | Gao et al. | |
| 9,845,732 B2 | 12/2017 | Crothers et al. | |
| 9,851,107 B2 | 12/2017 | Stuttaford et al. | |
| 9,885,481 B2 | 2/2018 | Duesing | |
| 9,890,714 B2 | 2/2018 | Soni et al. | |
| 9,890,955 B2 | 2/2018 | Freitag et al. | |
| 9,920,696 B2 | 3/2018 | Emberger et al. | |
| 9,927,818 B2 | 3/2018 | Rizkalla et al. | |
| 9,938,903 B2 | 4/2018 | Hughes et al. | |
| 9,945,294 B2 | 4/2018 | Hughes et al. | |
| 9,945,562 B2 | 4/2018 | Hughes et al. | |
| 9,958,162 B2 | 5/2018 | Dai et al. | |
| 10,220,474 B2 | 3/2019 | Theuer et al. | |
| 10,221,769 B2 | 3/2019 | Imfeld et al. | |
| 10,228,138 B2 | 3/2019 | Theuer et al. | |
| 2001/0027639 A1 | 10/2001 | Emmons | |
| 2001/0047650 A1 | 12/2001 | Muller et al. | |
| 2002/0020173 A1 | 2/2002 | Varney | |
| 2002/0043067 A1 | 4/2002 | Maeda et al. | |
| 2002/0100281 A1 | 8/2002 | Hellat et al. | |

(56) References Cited

U.S. PATENT DOCUMENTS

| | | |
|---|---|---|
| 2002/0134086 A1 | 9/2002 | Doebbeling et al. |
| 2002/0142257 A1 | 10/2002 | Eroglu et al. |
| 2002/0194851 A1 | 12/2002 | Stalder et al. |
| 2003/0010031 A1 | 1/2003 | Stuttaford et al. |
| 2003/0074885 A1 | 4/2003 | Rokke |
| 2003/0145576 A1 | 8/2003 | Scarinci et al. |
| 2003/0172655 A1 | 9/2003 | Verdouw et al. |
| 2004/0011051 A1 | 1/2004 | Ryan et al. |
| 2004/0040307 A1 | 3/2004 | Dimov et al. |
| 2004/0060301 A1 | 4/2004 | Chen et al. |
| 2004/0103663 A1 | 6/2004 | Haynes et al. |
| 2004/0172948 A1 | 9/2004 | Bellucci et al. |
| 2004/0177615 A1 | 9/2004 | Martling |
| 2004/0248053 A1 | 12/2004 | Benz et al. |
| 2005/0034458 A1 | 2/2005 | Burrus et al. |
| 2005/0103018 A1 | 5/2005 | Graf et al. |
| 2005/0126180 A1 | 6/2005 | Chen et al. |
| 2005/0166595 A1 | 8/2005 | Fletcher et al. |
| 2005/0188702 A1 | 9/2005 | Bachovchin et al. |
| 2005/0229581 A1 | 10/2005 | Bellucci et al. |
| 2006/0000220 A1 | 1/2006 | Sattinger |
| 2006/0021354 A1 | 2/2006 | Mowill et al. |
| 2006/0040225 A1 | 2/2006 | Garay et al. |
| 2006/0130455 A1 | 6/2006 | Griffiths |
| 2006/0218933 A1 | 10/2006 | Schuermans et al. |
| 2006/0272331 A1 | 12/2006 | Bucker et al. |
| 2007/0021899 A1 | 1/2007 | Griffin et al. |
| 2007/0033948 A1 | 2/2007 | Chen et al. |
| 2007/0044656 A1 | 3/2007 | Farmer et al. |
| 2007/0089427 A1 | 4/2007 | Scarinci |
| 2007/0105061 A1 | 5/2007 | Flohr et al. |
| 2007/0163267 A1 | 7/2007 | Flohr et al. |
| 2007/0224559 A1 | 9/2007 | Ni et al. |
| 2007/0271927 A1 | 11/2007 | Myers et al. |
| 2008/0087019 A1 | 4/2008 | MacQuisten et al. |
| 2009/0037029 A1 | 2/2009 | Garay et al. |
| 2009/0071159 A1 | 3/2009 | Parker et al. |
| 2009/0077945 A1 | 3/2009 | Cornwell et al. |
| 2009/0084082 A1 | 4/2009 | Martin et al. |
| 2009/0145131 A1 | 6/2009 | Kreutle et al. |
| 2009/0204306 A1 | 8/2009 | Goeke et al. |
| 2009/0229238 A1 | 9/2009 | Zhang et al. |
| 2009/0249792 A1 | 10/2009 | Guethe et al. |
| 2009/0249793 A1 | 10/2009 | Nilsson et al. |
| 2009/0277182 A1 | 11/2009 | Engelbrecht et al. |
| 2009/0282830 A1 | 11/2009 | Eroglu et al. |
| 2010/0018210 A1 | 1/2010 | Fox et al. |
| 2010/0043387 A1 | 2/2010 | Myers et al. |
| 2010/0077719 A1 | 4/2010 | Wilson et al. |
| 2010/0139286 A1 | 6/2010 | Gerward et al. |
| 2010/0170219 A1 | 7/2010 | Venkataraman et al. |
| 2010/0170251 A1 | 7/2010 | Davis, Jr. et al. |
| 2010/0170252 A1 | 7/2010 | Venkataraman et al. |
| 2010/0275603 A1 | 11/2010 | Saito et al. |
| 2010/0300108 A1 | 12/2010 | Demougeot et al. |
| 2011/0000219 A1 | 1/2011 | Myers, Jr. et al. |
| 2011/0005233 A1* | 1/2011 | Sadig .................. F23M 20/005 60/754 |
| 2011/0011054 A1 | 1/2011 | Bulat et al. |
| 2011/0027728 A1 | 2/2011 | Milosavljevic |
| 2011/0048018 A1* | 3/2011 | Schnell .................. F23R 3/002 60/722 |
| 2011/0059408 A1 | 3/2011 | Carroni et al. |
| 2011/0061390 A1 | 3/2011 | Kendrick |
| 2011/0061391 A1 | 3/2011 | Kendrick |
| 2011/0061392 A1 | 3/2011 | Kendrick |
| 2011/0061395 A1 | 3/2011 | Kendrick |
| 2011/0079667 A1 | 4/2011 | Stastny et al. |
| 2011/0179800 A1 | 7/2011 | De La Cruz Garcia et al. |
| 2011/0179803 A1 | 7/2011 | Berry et al. |
| 2011/0203250 A1* | 8/2011 | Huber .................. F23R 3/002 60/39.23 |
| 2011/0219776 A1 | 9/2011 | Bunker et al. |
| 2011/0265484 A1 | 11/2011 | Huber et al. |
| 2011/0289898 A1 | 12/2011 | Hellat et al. |
| 2011/0289899 A1 | 12/2011 | De La Cruz Garcia et al. |
| 2011/0308654 A1 | 12/2011 | Bothien et al. |
| 2012/0031103 A1 | 2/2012 | Abe et al. |
| 2012/0073305 A1 | 3/2012 | Knoepfel et al. |
| 2012/0122043 A1 | 5/2012 | Siewert et al. |
| 2012/0125008 A1 | 5/2012 | Prociw et al. |
| 2012/0131924 A1 | 5/2012 | Yoshida et al. |
| 2012/0260657 A1 | 10/2012 | Eroglu et al. |
| 2012/0279229 A1 | 11/2012 | Zinn et al. |
| 2012/0297777 A1 | 11/2012 | Poyyapakkam et al. |
| 2012/0304660 A1 | 12/2012 | Kupratis |
| 2012/0317986 A1 | 12/2012 | Zajadatz et al. |
| 2013/0008168 A1 | 1/2013 | Hase |
| 2013/0019605 A1 | 1/2013 | Garay et al. |
| 2013/0036741 A1 | 2/2013 | Prociw |
| 2013/0036744 A1 | 2/2013 | Emberger et al. |
| 2013/0042627 A1* | 2/2013 | Gerendas .................. F23R 3/10 60/782 |
| 2013/0067921 A1 | 3/2013 | Hadley et al. |
| 2013/0067925 A1 | 3/2013 | Bothien et al. |
| 2013/0086918 A1 | 4/2013 | Bothien et al. |
| 2013/0091857 A1 | 4/2013 | Thornton et al. |
| 2013/0125547 A1 | 5/2013 | Bothien et al. |
| 2013/0139513 A1 | 6/2013 | Stastny et al. |
| 2013/0145766 A1 | 6/2013 | Hawie et al. |
| 2013/0174558 A1 | 7/2013 | Stryapunin |
| 2013/0174560 A1 | 7/2013 | Wiebe et al. |
| 2013/0174561 A1 | 7/2013 | Stoia et al. |
| 2013/0192237 A1 | 8/2013 | Oskam |
| 2013/0224672 A1 | 8/2013 | Carroni et al. |
| 2013/0232988 A1 | 9/2013 | Dawson et al. |
| 2013/0283800 A1 | 10/2013 | Romig et al. |
| 2013/0298560 A1 | 11/2013 | Melton et al. |
| 2013/0305729 A1 | 11/2013 | Bathina et al. |
| 2013/0312704 A1 | 11/2013 | Taylor |
| 2013/0327045 A1 | 12/2013 | Fox et al. |
| 2013/0340438 A1 | 12/2013 | Abreu |
| 2014/0007578 A1 | 1/2014 | Genin et al. |
| 2014/0007582 A1 | 1/2014 | Abe et al. |
| 2014/0013754 A1 | 1/2014 | Slobodyanskiy et al. |
| 2014/0013758 A1 | 1/2014 | Chen |
| 2014/0033728 A1 | 2/2014 | Marmilic et al. |
| 2014/0053559 A1* | 2/2014 | Maurer .................. F23M 20/005 60/725 |
| 2014/0053566 A1 | 2/2014 | Eroglu et al. |
| 2014/0053569 A1 | 2/2014 | Bothien |
| 2014/0075949 A1 | 3/2014 | Prociw et al. |
| 2014/0109578 A1 | 4/2014 | Bothien et al. |
| 2014/0109579 A1 | 4/2014 | Dusing et al. |
| 2014/0109588 A1 | 4/2014 | Ciani et al. |
| 2014/0109591 A1 | 4/2014 | Bothien et al. |
| 2014/0116053 A1 | 5/2014 | Chen et al. |
| 2014/0123649 A1* | 5/2014 | Portillo Bilbao .......... F02C 7/24 60/725 |
| 2014/0123651 A1 | 5/2014 | Smith |
| 2014/0123665 A1 | 5/2014 | Wood et al. |
| 2014/0123670 A1 | 5/2014 | Eroglu et al. |
| 2014/0137566 A1 | 5/2014 | Shershnyov et al. |
| 2014/0144156 A1 | 5/2014 | Lang et al. |
| 2014/0165577 A1 | 6/2014 | Melton et al. |
| 2014/0174096 A1 | 6/2014 | Milosavljevic |
| 2014/0182294 A1 | 7/2014 | Matsumoto et al. |
| 2014/0190170 A1 | 7/2014 | Cai et al. |
| 2014/0196465 A1 | 7/2014 | Laster et al. |
| 2014/0200721 A1 | 7/2014 | Rizkalla et al. |
| 2014/0260259 A1 | 9/2014 | Ginesin et al. |
| 2014/0260262 A1 | 9/2014 | Davis, Jr. et al. |
| 2014/0260264 A1 | 9/2014 | Stoia et al. |
| 2014/0260265 A1 | 9/2014 | Beck et al. |
| 2014/0260269 A1 | 9/2014 | Davis, Jr. et al. |
| 2014/0260273 A1 | 9/2014 | Melton et al. |
| 2014/0260303 A1 | 9/2014 | Davis, Jr. et al. |
| 2014/0283523 A1 | 9/2014 | Menon et al. |
| 2014/0283525 A1 | 9/2014 | Scarinci et al. |
| 2014/0290264 A1 | 10/2014 | Hovel |
| 2014/0305128 A1 | 10/2014 | Poyyapakkam et al. |
| 2014/0325989 A1 | 11/2014 | Toronto et al. |
| 2014/0338353 A1 | 11/2014 | Milosavljevic |
| 2014/0345285 A1 | 11/2014 | Benz et al. |

(56) References Cited

U.S. PATENT DOCUMENTS

| | | | |
|---|---|---|---|
| 2014/0352312 A1 | 12/2014 | Beck et al. | |
| 2014/0352321 A1 | 12/2014 | Haynes et al. | |
| 2014/0360202 A1 | 12/2014 | Toon et al. | |
| 2014/0366542 A1 | 12/2014 | Teets et al. | |
| 2014/0366553 A1 | 12/2014 | Beck et al. | |
| 2015/0000282 A1 | 1/2015 | Genin et al. | |
| 2015/0000283 A1 | 1/2015 | Ramier et al. | |
| 2015/0020498 A1* | 1/2015 | Schilp | F01D 9/023 60/39.83 |
| 2015/0027100 A1 | 1/2015 | Qin et al. | |
| 2015/0040573 A1 | 2/2015 | Ferreira-Providakis et al. | |
| 2015/0047357 A1 | 2/2015 | Schuermans et al. | |
| 2015/0047360 A1 | 2/2015 | Baruah et al. | |
| 2015/0047364 A1 | 2/2015 | Gao et al. | |
| 2015/0047365 A1 | 2/2015 | Duesing et al. | |
| 2015/0052904 A1 | 2/2015 | Lipari et al. | |
| 2015/0059345 A1 | 3/2015 | Hellat et al. | |
| 2015/0059348 A1 | 3/2015 | Toronto et al. | |
| 2015/0075168 A1 | 3/2015 | De Jonge et al. | |
| 2015/0075174 A1 | 3/2015 | Abe et al. | |
| 2015/0107259 A1 | 4/2015 | Eroglu et al. | |
| 2015/0113990 A1 | 4/2015 | Eroglu | |
| 2015/0113992 A1 | 4/2015 | Tonon et al. | |
| 2015/0128600 A1 | 5/2015 | Miduturi et al. | |
| 2015/0159563 A1 | 6/2015 | Soni et al. | |
| 2015/0159872 A1 | 6/2015 | Melton et al. | |
| 2015/0159876 A1 | 6/2015 | Freitag et al. | |
| 2015/0159877 A1 | 6/2015 | Stoia et al. | |
| 2015/0176842 A1 | 6/2015 | Doebbeling et al. | |
| 2015/0184858 A1 | 7/2015 | Stuttaford et al. | |
| 2015/0198334 A1 | 7/2015 | Duesing et al. | |
| 2015/0211742 A1 | 7/2015 | Lee et al. | |
| 2015/0219019 A1 | 8/2015 | Crothers et al. | |
| 2015/0219338 A1 | 8/2015 | Dai et al. | |
| 2015/0233276 A1 | 8/2015 | Cassity et al. | |
| 2015/0247459 A1 | 9/2015 | Carrere et al. | |
| 2015/0247641 A1 | 9/2015 | Patel et al. | |
| 2015/0260407 A1 | 9/2015 | Crothers et al. | |
| 2015/0275755 A1 | 10/2015 | Ogata et al. | |
| 2015/0276226 A1 | 10/2015 | Laster et al. | |
| 2015/0285141 A1 | 10/2015 | Manabe et al. | |
| 2015/0285501 A1 | 10/2015 | Dicintio et al. | |
| 2015/0285504 A1 | 10/2015 | Melton et al. | |
| 2015/0308349 A1 | 10/2015 | Rohrssen et al. | |
| 2015/0337741 A1 | 11/2015 | Gassner et al. | |
| 2015/0337742 A1 | 11/2015 | Bernero et al. | |
| 2015/0345316 A1 | 12/2015 | Henderson et al. | |
| 2015/0345402 A1 | 12/2015 | Crothers et al. | |
| 2015/0345791 A1 | 12/2015 | Whiteman et al. | |
| 2015/0345794 A1 | 12/2015 | Crothers et al. | |
| 2015/0362194 A1 | 12/2015 | Ogata et al. | |
| 2015/0377126 A1 | 12/2015 | Harper et al. | |
| 2016/0010864 A1 | 1/2016 | Abe et al. | |
| 2016/0010867 A1 | 1/2016 | Gao et al. | |
| 2016/0017775 A1* | 1/2016 | Mattia | F02K 1/827 181/213 |
| 2016/0018110 A1 | 1/2016 | Stuttaford et al. | |
| 2016/0018111 A1 | 1/2016 | Therkorn et al. | |
| 2016/0033131 A1 | 2/2016 | Ogata et al. | |
| 2016/0040881 A1 | 2/2016 | Cunha et al. | |
| 2016/0040884 A1 | 2/2016 | Citeno et al. | |
| 2016/0047317 A1 | 2/2016 | Willis et al. | |
| 2016/0069271 A1 | 3/2016 | Shinkle et al. | |
| 2016/0069568 A1 | 3/2016 | Ciani et al. | |
| 2016/0076766 A1 | 3/2016 | Jayatunga | |
| 2016/0076772 A1 | 3/2016 | Metternich et al. | |
| 2016/0084169 A1 | 3/2016 | Stuttaford et al. | |
| 2016/0123595 A1 | 5/2016 | Eroglu et al. | |
| 2016/0123596 A1 | 5/2016 | Hoke et al. | |
| 2016/0123597 A1 | 5/2016 | Pennell et al. | |
| 2016/0138808 A1 | 5/2016 | Huebner et al. | |
| 2016/0153661 A1 | 6/2016 | Bothien et al. | |
| 2016/0169513 A1 | 6/2016 | Sobol et al. | |
| 2016/0177834 A1 | 6/2016 | Patel et al. | |
| 2016/0177836 A1 | 6/2016 | Wickstrom et al. | |
| 2016/0178200 A1 | 6/2016 | Ciani et al. | |
| 2016/0178207 A1 | 6/2016 | Bothien et al. | |
| 2016/0195271 A1 | 7/2016 | Kostlin Berthold et al. | |
| 2016/0215984 A1 | 7/2016 | Bothien et al. | |
| 2016/0237916 A1 | 8/2016 | Ferreira-Providakis et al. | |
| 2016/0245523 A1 | 8/2016 | Kim et al. | |
| 2016/0245524 A1 | 8/2016 | Hill et al. | |
| 2016/0245525 A1 | 8/2016 | Snyder, III et al. | |
| 2016/0252017 A1 | 9/2016 | Schesny et al. | |
| 2016/0252251 A1 | 9/2016 | Biagioli et al. | |
| 2016/0258629 A1 | 9/2016 | Slobodyanskiy et al. | |
| 2016/0273775 A1 | 9/2016 | Griffiths et al. | |
| 2016/0281992 A1 | 9/2016 | Dicintio et al. | |
| 2016/0290649 A1 | 10/2016 | Prociw | |
| 2016/0298852 A1 | 10/2016 | Snyder, III et al. | |
| 2016/0305327 A1 | 10/2016 | Patel et al. | |
| 2016/0320063 A1 | 11/2016 | Dai et al. | |
| 2016/0320064 A1 | 11/2016 | Hawie et al. | |
| 2016/0326955 A1 | 11/2016 | Emberger et al. | |
| 2016/0356495 A1 | 12/2016 | Bernero et al. | |
| 2016/0377291 A1 | 12/2016 | Prociw et al. | |
| 2017/0002742 A1 | 1/2017 | Jorgensen et al. | |
| 2017/0002743 A1 | 1/2017 | Jorgensen et al. | |
| 2017/0003032 A1 | 1/2017 | Jorgensen et al. | |
| 2017/0009993 A1 | 1/2017 | Monahan et al. | |
| 2017/0059164 A1 | 3/2017 | Knapp et al. | |
| 2017/0101934 A1 | 4/2017 | Sheil et al. | |
| 2017/0114717 A1 | 4/2017 | Martin et al. | |
| 2017/0175634 A1 | 6/2017 | Hughes et al. | |
| 2017/0175635 A1 | 6/2017 | Hughes et al. | |
| 2017/0175636 A1 | 6/2017 | Hughes et al. | |
| 2017/0175637 A1 | 6/2017 | Hughes et al. | |
| 2017/0176013 A1 | 6/2017 | Hughes et al. | |
| 2017/0176014 A1 | 6/2017 | Hughes et al. | |
| 2017/0191665 A1 | 7/2017 | Ciani et al. | |
| 2017/0191668 A1 | 7/2017 | Hughes et al. | |
| 2017/0198913 A1 | 7/2017 | Bertoncello et al. | |
| 2017/0234133 A1 | 8/2017 | Prescott et al. | |
| 2017/0234541 A1 | 8/2017 | Ciani et al. | |
| 2017/0254541 A1 | 9/2017 | Bottcher et al. | |
| 2017/0254542 A1 | 9/2017 | Cihlar et al. | |
| 2017/0260866 A1 | 9/2017 | Meadows et al. | |
| 2017/0268781 A1 | 9/2017 | Stevenson et al. | |
| 2017/0268784 A1 | 9/2017 | Crawley et al. | |
| 2017/0268785 A1 | 9/2017 | Crawley | |
| 2017/0276362 A1 | 9/2017 | Berry et al. | |
| 2017/0276364 A1 | 9/2017 | Berry et al. | |
| 2017/0276365 A1 | 9/2017 | Berry et al. | |
| 2017/0276366 A1 | 9/2017 | Berry et al. | |
| 2017/0276367 A1 | 9/2017 | Batakis | |
| 2017/0276369 A1 | 9/2017 | Berry et al. | |
| 2017/0284675 A1 | 10/2017 | North et al. | |
| 2017/0292695 A1 | 10/2017 | Bolanos-Chaverri et al. | |
| 2017/0292708 A1 | 10/2017 | Terhaar et al. | |
| 2017/0298817 A1 | 10/2017 | Horiuchi et al. | |
| 2017/0298827 A1 | 10/2017 | Berry et al. | |
| 2017/0298837 A1 | 10/2017 | Eroglu et al. | |
| 2017/0298839 A1 | 10/2017 | Hill | |
| 2017/0298840 A1 | 10/2017 | Doody | |
| 2017/0299185 A1 | 10/2017 | Berry et al. | |
| 2017/0299186 A1 | 10/2017 | Berry et al. | |
| 2017/0321609 A1 | 11/2017 | Ogata et al. | |
| 2017/0342912 A1 | 11/2017 | Kim et al. | |
| 2017/0343217 A1 | 11/2017 | Chen et al. | |
| 2017/0356654 A1 | 12/2017 | Locke et al. | |
| 2017/0356656 A1 | 12/2017 | Ogata et al. | |
| 2017/0363004 A1 | 12/2017 | Xu et al. | |
| 2018/0010528 A1 | 1/2018 | Bolanos-Chaverri et al. | |
| 2018/0080654 A1 | 3/2018 | Freitag et al. | |
| 2018/0094590 A1 | 4/2018 | Proscia et al. | |
| 2018/0094817 A1 | 4/2018 | Proscia et al. | |
| 2018/0112875 A1 | 4/2018 | Daniel | |
| 2018/0156128 A1* | 6/2018 | Imfeld | F23R 3/002 |
| 2018/0156460 A1* | 6/2018 | Theuer | F23R 3/16 |
| 2018/0156461 A1* | 6/2018 | Theuer | F23R 3/002 |
| 2018/0229829 A1* | 8/2018 | Pierick | F02C 7/24 |
| 2018/0313540 A1* | 11/2018 | Nagaraja | F23R 3/10 |
| 2019/0093891 A1 | 3/2019 | Graham et al. | |
| 2020/0370478 A1 | 11/2020 | Biagioli et al. | |

(56) References Cited

U.S. PATENT DOCUMENTS

FOREIGN PATENT DOCUMENTS

| | | |
|---|---|---|
| EP | 859937 A1 | 8/1998 |
| EP | 715124 A3 | 12/1998 |
| EP | 801268 A3 | 7/1999 |
| EP | 605158 B1 | 9/1999 |
| EP | 766045 B1 | 9/2000 |
| EP | 711957 B1 | 3/2003 |
| EP | 1327824 A1 | 7/2003 |
| EP | 987495 B1 | 10/2003 |
| EP | 1659338 A1 | 5/2006 |
| EP | 1686321 A2 | 8/2006 |
| EP | 1746347 A2 | 1/2007 |
| EP | 1703344 B1 | 10/2007 |
| EP | 1884714 A2 | 2/2008 |
| EP | 1942303 A1 | 7/2008 |
| EP | 1985927 A2 | 10/2008 |
| EP | 2028422 A2 | 2/2009 |
| EP | 2119964 A1 | 11/2009 |
| EP | 2161500 A1 | 3/2010 |
| EP | 2169303 A2 | 3/2010 |
| EP | 2206964 A2 | 7/2010 |
| EP | 2236935 A2 | 10/2010 |
| EP | 2369236 A2 | 9/2011 |
| EP | 2385233 A1 | 11/2011 |
| EP | 2532857 A1 | 12/2012 |
| EP | 2532968 A2 | 12/2012 |
| EP | 2554910 A2 | 2/2013 |
| EP | 2589877 A2 | 5/2013 |
| EP | 2613082 A1 | 7/2013 |
| EP | 2647911 A2 | 10/2013 |
| EP | 2657483 A2 | 10/2013 |
| EP | 2667096 A2 | 11/2013 |
| EP | 2700879 A2 | 2/2014 |
| EP | 2725301 A1 | 4/2014 |
| EP | 2725302 A1 | 4/2014 |
| EP | 2728258 A1 | 5/2014 |
| EP | 2746666 A2 | 6/2014 |
| EP | 2789915 A1 | 10/2014 |
| EP | 2831507 A2 | 2/2015 |
| EP | 2837782 A1 | 2/2015 |
| EP | 2354663 A3 | 3/2015 |
| EP | 2851618 A1 | 3/2015 |
| EP | 2853720 A2 | 4/2015 |
| EP | 2865947 A1 | 4/2015 |
| EP | 2889542 A1 | 7/2015 |
| EP | 2894405 A1 | 7/2015 |
| EP | 2933559 A1 | 10/2015 |
| EP | 2966356 A1 | 1/2016 |
| EP | 2975326 A1 | 1/2016 |
| EP | 2504545 B1 | 2/2016 |
| EP | 2989389 A1 | 3/2016 |
| EP | 2993404 A1 | 3/2016 |
| EP | 2993406 A1 | 3/2016 |
| EP | 3002518 A1 | 4/2016 |
| EP | 3015771 A1 | 5/2016 |
| EP | 3015772 A1 | 5/2016 |
| EP | 3023698 A1 | 5/2016 |
| EP | 3029376 A1 | 6/2016 |
| EP | 3032177 A1 | 6/2016 |
| EP | 3034945 A1 | 6/2016 |
| EP | 3037726 A1 | 6/2016 |
| EP | 3037728 A1 | 6/2016 |
| EP | 3051206 A1 | 8/2016 |
| EP | 3056814 A1 | 8/2016 |
| EP | 3059498 A1 | 8/2016 |
| EP | 3061944 A1 | 8/2016 |
| EP | 3061945 A1 | 8/2016 |
| EP | 3061949 A1 | 8/2016 |
| EP | 3062019 A1 | 8/2016 |
| EP | 3070408 A1 | 9/2016 |
| EP | 3091286 A1 | 11/2016 |
| EP | 3098516 A1 | 11/2016 |
| EP | 3101342 A1 | 12/2016 |
| EP | 3115693 A1 | 1/2017 |
| EP | 1909031 B1 | 2/2017 |
| EP | 3135880 A1 | 3/2017 |
| EP | 3156629 A1 | 4/2017 |
| EP | 3184748 A1 | 6/2017 |
| EP | 3184903 A1 | 6/2017 |
| EP | 3184905 A1 | 6/2017 |
| EP | 3208443 A1 | 8/2017 |
| EP | 3214374 A1 | 9/2017 |
| EP | 3217000 A1 | 9/2017 |
| EP | 3220052 A1 | 9/2017 |
| EP | 3220054 A1 | 9/2017 |
| EP | 3220056 A1 | 9/2017 |
| EP | 3225915 A1 | 10/2017 |
| EP | 3228937 A1 | 10/2017 |
| EP | 3228939 A1 | 10/2017 |
| EP | 3239610 A1 | 11/2017 |
| EP | 3255346 A1 | 12/2017 |
| EP | 3260780 A1 | 12/2017 |
| EP | 3267107 A1 | 1/2018 |
| EP | 3301372 A1 | 4/2018 |
| EP | 3301373 A2 | 4/2018 |
| EP | 3312510 A1 | 4/2018 |
| EP | 3315866 A1 | 5/2018 |
| WO | 1998017951 A1 | 4/1998 |
| WO | 1999017057 A1 | 4/1999 |
| WO | 1999032771 A1 | 7/1999 |
| WO | 1999046540 A1 | 9/1999 |
| WO | 2001018371 A1 | 3/2001 |
| WO | 2001040111 A1 | 6/2001 |
| WO | 2002042624 A1 | 5/2002 |
| WO | 2002052201 A1 | 7/2002 |
| WO | 2002061337 A1 | 8/2002 |
| WO | 2003067054 A2 | 8/2003 |
| WO | 2003078811 A1 | 9/2003 |
| WO | 2004010052 A1 | 1/2004 |
| WO | 2005059442 A1 | 6/2005 |
| WO | 2005093326 A2 | 10/2005 |
| WO | 2006015968 A1 | 2/2006 |
| WO | 2006053825 A1 | 5/2006 |
| WO | 2006133563 A1 | 12/2006 |
| WO | 2007025822 A1 | 3/2007 |
| WO | 2007028711 A1 | 3/2007 |
| WO | 2007033306 A2 | 3/2007 |
| WO | 2007099046 A1 | 9/2007 |
| WO | 2007113130 A1 | 10/2007 |
| WO | 2008080639 A1 | 7/2008 |
| WO | 2008110554 A1 | 9/2008 |
| WO | 2008112220 A1 | 9/2008 |
| WO | 2008114730 A1 | 9/2008 |
| WO | 2008129652 A1 | 10/2008 |
| WO | 2009038625 A2 | 3/2009 |
| WO | 2009075335 A1 | 6/2009 |
| WO | 2009078891 A2 | 6/2009 |
| WO | 2009084587 A1 | 7/2009 |
| WO | 2009119392 A1 | 10/2009 |
| WO | 2009121669 A1 | 10/2009 |
| WO | 2009121776 A1 | 10/2009 |
| WO | 2009121779 A1 | 10/2009 |
| WO | 2009121820 A1 | 10/2009 |
| WO | 2010014125 A2 | 2/2010 |
| WO | 2010018069 A1 | 2/2010 |
| WO | 2010072710 A2 | 7/2010 |
| WO | 2011019684 A2 | 2/2011 |
| WO | 2011031595 A2 | 3/2011 |
| WO | 2011117042 A1 | 9/2011 |
| WO | 2011138395 A2 | 11/2011 |
| WO | 2011152944 A2 | 12/2011 |
| WO | 2012007488 A2 | 1/2012 |
| WO | 2012038403 A1 | 3/2012 |
| WO | 2012038404 A1 | 3/2012 |
| WO | 2012039611 A1 | 3/2012 |
| WO | 2012045706 A1 | 4/2012 |
| WO | 2012134325 A1 | 10/2012 |
| WO | 2012136787 A1 | 10/2012 |
| WO | 2012152461 A1 | 11/2012 |
| WO | 2013002664 A1 | 1/2013 |
| WO | 2013002669 A1 | 1/2013 |
| WO | 2013009211 A1 | 1/2013 |
| WO | 2013028167 A2 | 2/2013 |

(56) References Cited

FOREIGN PATENT DOCUMENTS

| | | |
|---|---|---|
| WO | 2013028169 A1 | 2/2013 |
| WO | 2013035474 A1 | 3/2013 |
| WO | 2013043076 A1 | 3/2013 |
| WO | 2013043768 A1 | 3/2013 |
| WO | 2013064383 A1 | 5/2013 |
| WO | 2013083348 A2 | 6/2013 |
| WO | 2013085411 A1 | 6/2013 |
| WO | 2013092411 A1 | 6/2013 |
| WO | 2013139868 A2 | 9/2013 |
| WO | 2013144070 A1 | 10/2013 |
| WO | 2013191954 A1 | 12/2013 |
| WO | 2014055437 A1 | 4/2014 |
| WO | 2014063835 A1 | 5/2014 |
| WO | 2014074371 A1 | 5/2014 |
| WO | 2014080758 A1 | 5/2014 |
| WO | 2014092185 A1 | 6/2014 |
| WO | 2014128112 A1 | 8/2014 |
| WO | 2014128124 A1 | 8/2014 |
| WO | 2014128146 A1 | 8/2014 |
| WO | 2014141397 A1 | 9/2014 |
| WO | 2014173578 A1 | 10/2014 |
| WO | 2014173660 A1 | 10/2014 |
| WO | 2014197070 A2 | 12/2014 |
| WO | 2015040228 A1 | 3/2015 |
| WO | 2015073215 A1 | 5/2015 |
| WO | 2015108583 A2 | 7/2015 |
| WO | 2015147934 A1 | 10/2015 |
| WO | 2015148751 A1 | 10/2015 |
| WO | 2015178389 A1 | 11/2015 |
| WO | 2015199690 A1 | 12/2015 |
| WO | 2016021298 A1 | 2/2016 |
| WO | 2016022135 A1 | 2/2016 |
| WO | 2016037966 A1 | 3/2016 |
| WO | 2016056579 A1 | 4/2016 |
| WO | 2016072423 A1 | 5/2016 |
| WO | 2016084111 A1 | 6/2016 |
| WO | 2016104725 A1 | 6/2016 |
| WO | 2016144752 A1 | 9/2016 |
| WO | 2016174175 A1 | 11/2016 |
| WO | 2017002075 A2 | 1/2017 |
| WO | 2017018982 A1 | 2/2017 |
| WO | 2017018992 A1 | 2/2017 |
| WO | 2017034435 A1 | 3/2017 |
| WO | 2017042250 A1 | 3/2017 |
| WO | 2017074345 A1 | 5/2017 |
| WO | 2017155914 A1 | 9/2017 |
| WO | 2017165092 A1 | 9/2017 |
| WO | 2017165611 A1 | 9/2017 |
| WO | 2017172408 A1 | 10/2017 |
| WO | 2017204949 A1 | 11/2017 |
| WO | 2018026381 A1 | 2/2018 |

* cited by examiner

SYSTEM AND METHOD FOR HIGH FREQUENCY ACOUSTIC DAMPERS WITH BAFFLES

BACKGROUND

The field of the disclosure relates generally to gas turbine engines, and more particularly to a high frequency dampers used within gas turbine engines.

Gas turbine engines typically include at least one compressor, at least one burner, and at least one turbine arranged in a serial flow configuration. Typically, the compressor channels compressed air to the burner where it is mixed with a flow of fuel and combusted, creating a high temperature flow of combustion gas that is channeled to the turbine. However, combustion within at least some burners may be unstable because the combustion dynamics within the burner may be unstable. Specifically, heat released during combustion, combined with the increased pressure caused by combustion, may cause acoustic pressure oscillations to develop within the burner.

Within known burners, the acoustic pressure oscillations typically occur during normal operating conditions and may depend on a fuel-to-air stoichiometry within the burner, a total mass flow within the burner, and/or other operating conditions. Over time, the acoustic pressure oscillations may cause equipment damage or other operational problems. To facilitate reducing the effect of the acoustic pressure oscillations, at least some burners include at least one acoustic damper that absorbs the acoustic pressure oscillations and that reduces the amplitude of the pressure oscillations. To prevent damage to the acoustic damper and to keep the acoustic damper clean, a flow of compressed cooling air is channeled into the acoustic damper. However, if the flow of compressed cooling air enters the acoustic damper at a high velocity, the pressure within the acoustic damper may decrease, allowing hot combustion gases to flow into the acoustic damper. In contrast, if the flow of cooling air is at a low velocity, cooling may be ineffective within the acoustic damper.

BRIEF DESCRIPTION

In one aspect, an acoustic damper for a rotary machine is provided. The rotary machine includes at least one burner including a front panel having a front side and an opposing back side. The acoustic damper includes at least one wall, at least one cooling air inlet, at least one outlet, and at least one baffle. The at least one wall extends from the back side of the front panel and defines a dampening chamber. The at least one cooling air inlet is defined within the back side of the front panel and is configured to channel a flow of cooling air into the dampening chamber. The at least one outlet is defined within the back side of the front panel and is configured to channel the flow of cooling air out of the dampening chamber. The at least one baffle extends from the back side of the front panel and is configured to reduce a velocity of the flow of cooling air within the dampening chamber.

In another aspect, a method of manufacturing an acoustic damper on a front panel of a burner is provided. The method includes defining an outlet through the front panel. The outlet extends from a front side of the front panel to a back side of the front panel. The method also includes defining at least one cooling air inlet within the back side of the front panel. The method further includes forming at least one wall on the back side of the front panel. The at least one wall and the back side of the front panel defining a dampening chamber. The method also includes forming at least one baffle on the back side of the front panel. The at least one baffle is configured to reduce a velocity of a flow of cooling air within the dampening chamber.

In another aspect, a rotary machine is provided. The rotary machine includes at least one burner and at least one acoustic damper. The at least one burner includes a front panel having a front side and an opposing back side. The at least one acoustic damper is positioned on the back side of the front panel and includes at least one wall, at least one cooling air inlet, at least one outlet, and at least one baffle. The at least one wall extends from the back side of the front panel and defines a dampening chamber. The at least one cooling air inlet is defined within the back side of the front panel and is configured to channel a flow of cooling air into the dampening chamber. The at least one outlet is defined within the back side of the front panel and is configured to channel the flow of cooling air out of the dampening chamber. The at least one baffle extends from the back side of the front panel and is configured to reduce a velocity of the flow of cooling air within the dampening chamber.

DETAILED DESCRIPTION

The exemplary acoustic dampers and methods described herein facilitate reducing a velocity of a cooling stream within the acoustic dampers, reducing acoustic oscillations within a burner, and reducing the ingestion of hot gas into the acoustic damper. The exemplary acoustic dampers described herein include at least one wall extending from a back side of a front panel of a burner. The wall and the back side of the front panel define a dampening chamber. The back side of the front panel also defines at least one cooling air inlet and at least one outlet. The cooling air inlet is oriented to channel a flow of cooling air into the dampening chamber, and the outlet is oriented to channel the flow of cooling air from the dampening chamber. The damper further includes at least one baffle extending from the back side of the front panel and positioned within a flow path of the flow of cooling air.

During operation, the outlet of the acoustic damper enables passage of acoustic oscillations into the acoustic damper, thus dampening the acoustic pressure oscillations and reducing damage to the burner. The flow of cooling air into the dampening chamber cools the acoustic damper and facilitates reducing damage to the acoustic damper. A velocity of the flow of cooling air within the dampening chamber reduces a pressure within the dampening chamber. The reduced pressure may enable hot combustion gases to be ingested or channeled into dampening chamber, potentially causing damage to the acoustic damage. The baffle facilitates reducing the velocity of the flow of cooling air and reducing potential damage to the acoustic damper caused by ingestion of combustion gases.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Approximating language may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
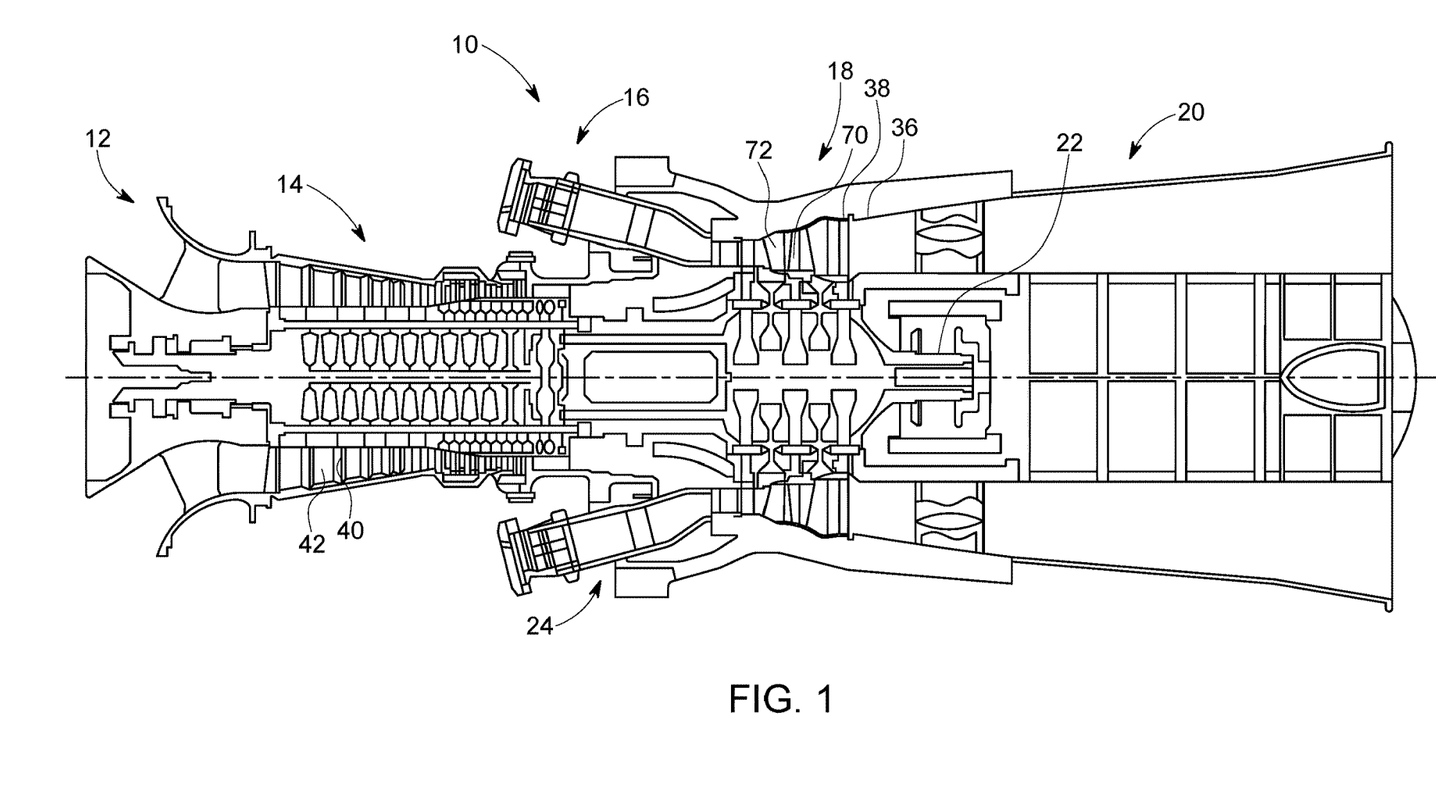
FIG. 1 is a schematic diagram of an exemplary rotary machine.

FIG. 1 is a schematic view of an exemplary rotary machine 10 with which embodiments of the current disclosure may be used. In the exemplary embodiment, rotary machine 10 is a gas turbine that includes an intake section 12, a compressor section 14 coupled downstream from intake section 12, a combustor section 16 coupled downstream from compressor section 14, a turbine section 18 coupled downstream from combustor section 16, and an exhaust section 20 coupled downstream from turbine section 18. A generally tubular casing 36 at least partially encloses one or more of intake section 12, compressor section 14, combustor section 16, turbine section 18, and exhaust section 20. In alternative embodiments, rotary machine 10 is any machine having rotor blades for which the embodiments of the current disclosure are enabled to function as described herein. In the exemplary embodiment, turbine section 18 is coupled to compressor section 14 via a rotor shaft 22. It should be noted that, as used herein, the term "couple" is not limited to a direct mechanical, electrical, and/or communication connection between components, but may also include an indirect mechanical, electrical, and/or communication connection between multiple components.

During operation of gas turbine 10, intake section 12 channels air towards compressor section 14. Compressor section 14 compresses the air to a higher pressure and temperature. More specifically, rotor shaft 22 imparts rotational energy to at least one circumferential row of compressor blades 40 coupled to rotor shaft 22 within compressor section 14. In the exemplary embodiment, each row of compressor blades 40 is preceded by a circumferential row of compressor stator vanes 42 extending radially inward from casing 36 that direct the air flow into compressor blades 40. The rotational energy of compressor blades 40 increases a pressure and temperature of the air. Compressor section 14 discharges the compressed air towards combustor section 16.

In combustor section 16, compressed air is mixed with fuel and ignited to generate combustion gases that are channeled towards turbine section 18. More specifically, combustor section 16 includes at least one burner 24, in which a fuel, for example, natural gas and/or fuel oil, is injected into the air flow, and the fuel-air mixture is ignited to generate high temperature combustion gases that are channeled towards turbine section 18.

Turbine section 18 converts thermal energy from the combustion gas stream to mechanical rotational energy. More specifically, the combustion gases impart rotational energy to at least one circumferential row of rotor blades 70 coupled to rotor shaft 22 within turbine section 18. In the exemplary embodiment, each row of rotor blades 70 is preceded by a circumferential row of turbine stator vanes 72 extending radially inward from casing 36 that direct the combustion gases into rotor blades 70. Rotor shaft 22 may be coupled to a load (not shown) such as, but not limited to, an electrical generator and/or a mechanical drive application. The exhausted combustion gases flow downstream from turbine section 18 into exhaust section 20.

Figure 2:
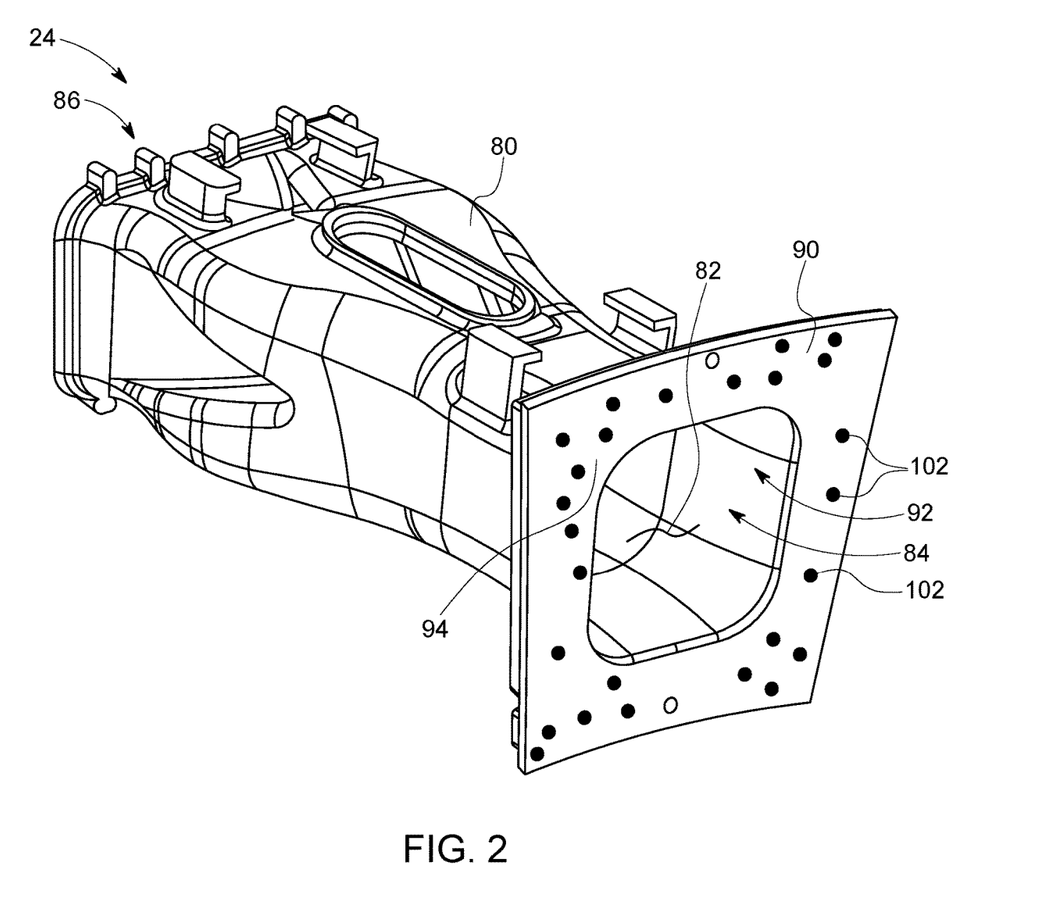
FIG. 2 is a perspective view of an exemplary burner positioned with a combustor section of the rotary machine shown in FIG. 1.
Figure 3:
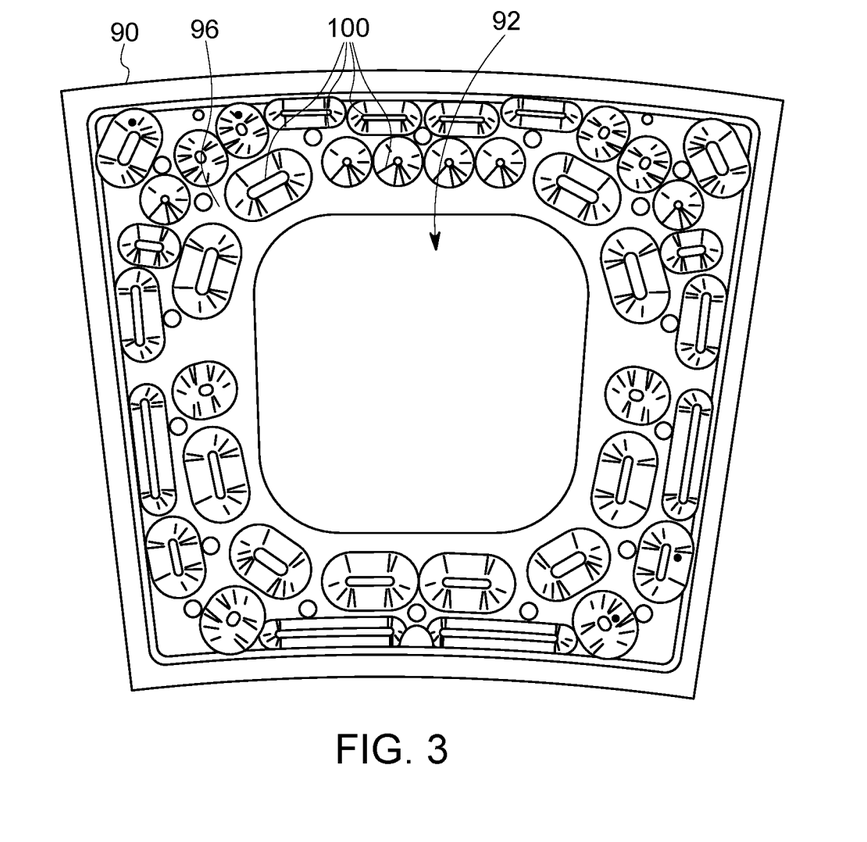
FIG. 3 is a rear view of an exemplary front panel that may be positioned within the burner shown in FIG. 2.

FIG. 2 is a perspective view of burner 24 positioned with combustor section 16 and including an exemplary front panel 90. FIG. 3 is a rear view of front panel 90 positioned within burner 24. Burner 24 includes at least one burner wall 80 that defines a burner chamber 82, a burner inlet 84, and a burner outlet 86. Front panel 90 is coupled to burner inlet 84 and defines a front panel inlet 92. Front panel 90 has a front side 94 and a back side 96 that is opposite front side 94. Front panel 90 is positioned on burner 24 such that back side 96 is coupled to burner 24, and front side 94 is oriented away from burner 24. As shown in FIG. 3, a plurality of acoustic dampers 100 extend across on back side 96 of front panel 90. In the exemplary embodiment, about thirty to about forty acoustic dampers 100 are positioned on back side 96 of front panel 90. However, any number of acoustic dampers 100 that enable burner 24 to operate as described herein may be positioned on back side 96 of front panel 90. Front panel 90 defines a plurality of outlets 102 that extend through front panel 90 from front side 94 to back side 96.

During operations, the flow of compressed air from compressor section 14 is channeled into burner 24 through front panel inlet 92 and burner inlet 84. A flow of fuel is injected into the flow of compressed air and the mixture of compressed air and fuel is ignited. Combustion within burner 24 may be unstable because the combustion dynamics within burner 24 may be unstable. Specifically, heat released during combustion, combined with the increased pressure caused by combustion, may cause acoustic pressure oscillations within burner 24. Acoustic pressure oscillations generally occur during normal operating conditions and may depend on a fuel-to-air stoichiometry within burner 24, a total mass flow within burner 24, and/or other operating conditions. The acoustic pressure oscillations may cause equipment damage or other operational problems. However, acoustic dampers 100 facilitate absorbing the acoustic pressure oscillations and/or reducing the amplitude of the pressure oscillations. Specifically, outlets 102 enable the acoustic pressure oscillations to enter acoustic dampers 100 where the acoustic pressure oscillations are dampened.

Figure 4:
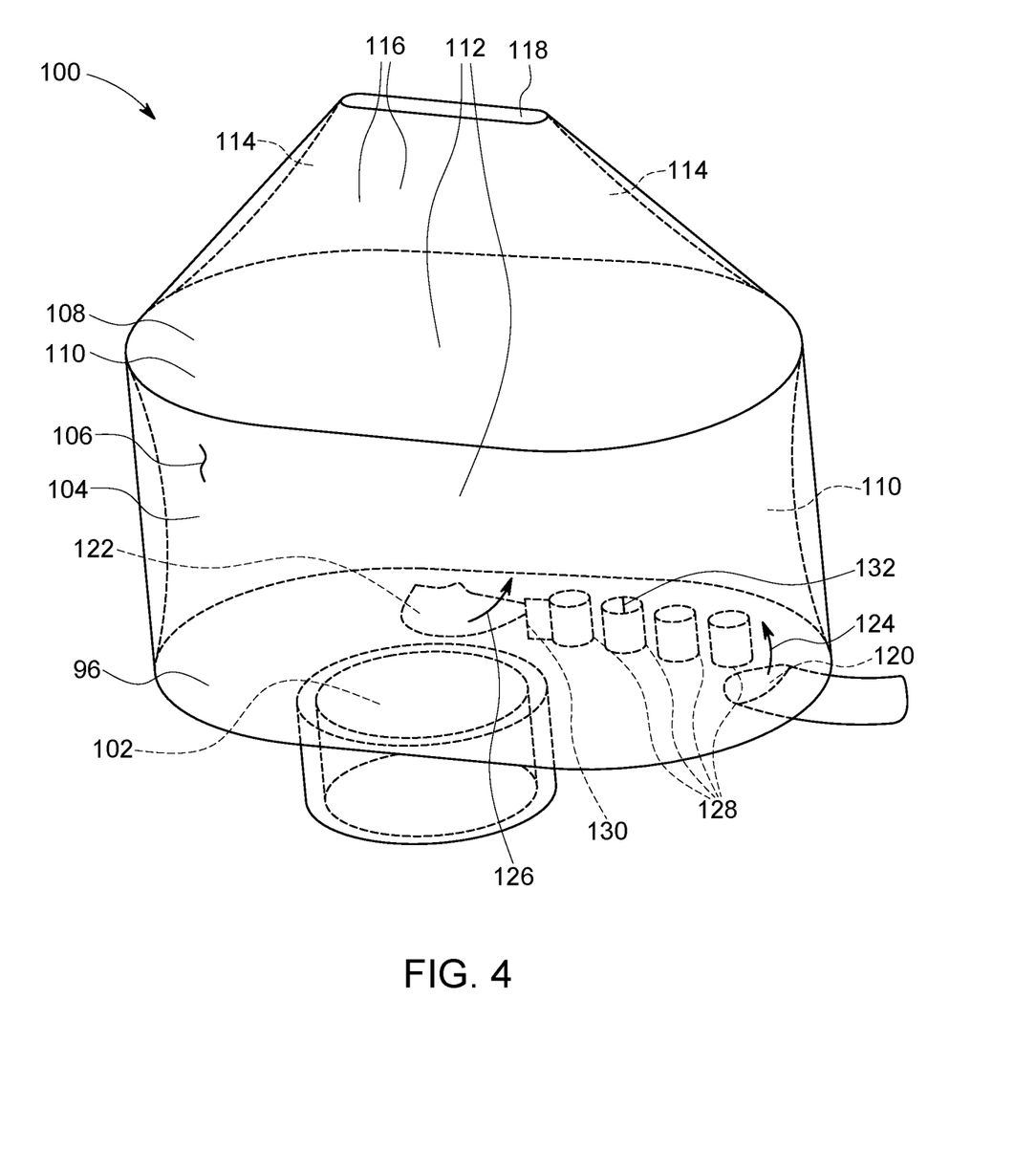
FIG. 4 is a perspective view of an exemplary acoustic damper that may be positioned on a back side of the front panel shown in FIG. 3.
Figure 5:
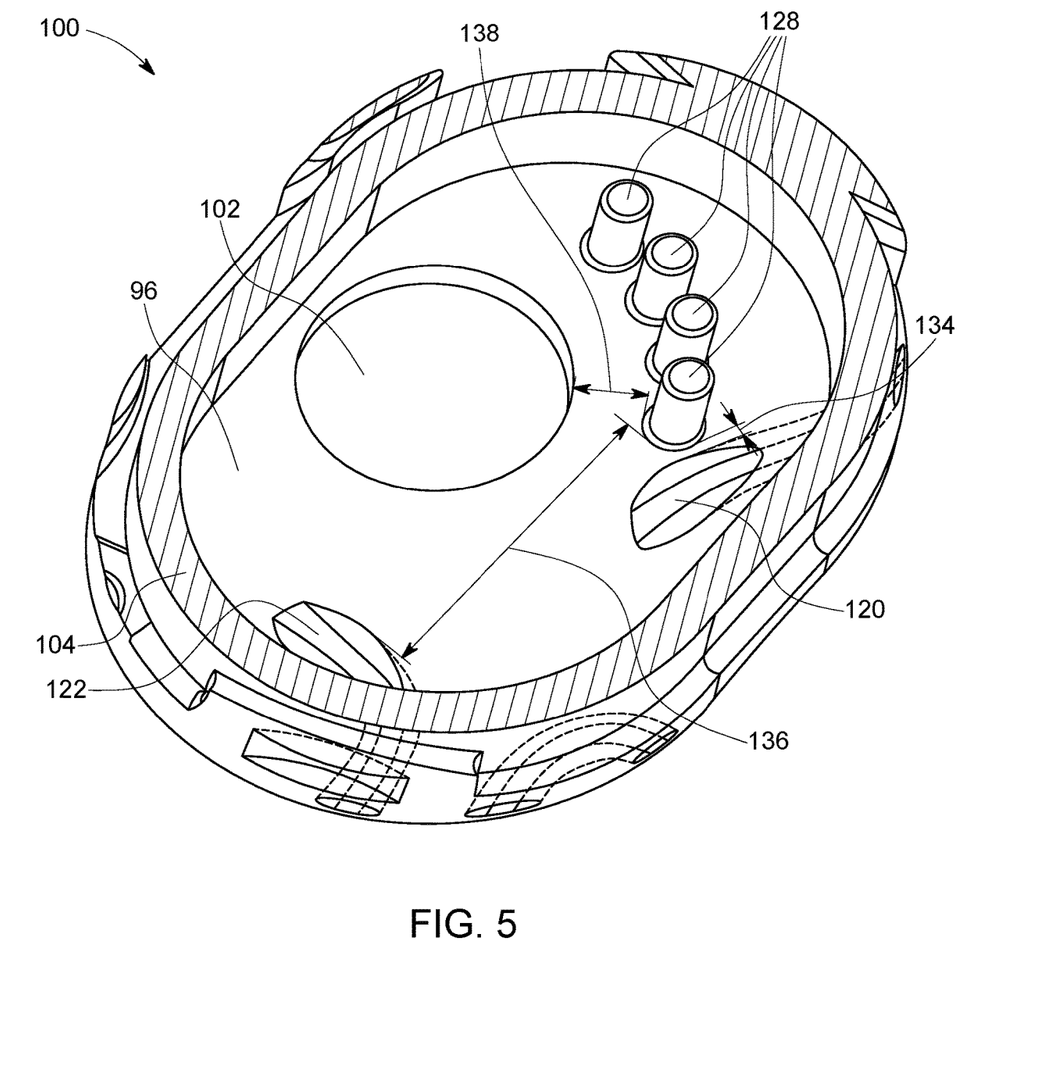
FIG. 5 is a perspective cutaway view of the acoustic damper shown in FIG. 3.

FIG. 4 is a perspective view of acoustic damper 100. FIG. 5 is a perspective cutaway view of acoustic damper 100. Acoustic damper 100 includes at least one wall 104 that cooperates with back side 96 of front panel 90 to define a dampening chamber 106. In the exemplary embodiment, acoustic damper 100 also includes a top 108. Wall 104, top 108, and back side 96 of front panel 90 cooperate to define dampening chamber 106. Wall 104, top 108, and back side 96 are shown as transparent in FIG. 4.

In the illustrated embodiment, wall 104 in generally elliptical and extends substantially perpendicularly from back side 96. Specifically, in the illustrated embodiment, wall 104 includes two semicircular arcs 110 and two straight portions 112 that extend substantially perpendicularly from back side 96. Straight portions 112 extend continuously from semicircular arcs 110. Top 108 includes two half cones 114 on semicircular arcs 110 and two angled portions 116 on straight portions 112. Angled portions 116 are coupled to half cones 114 such that angled portions 116 form an elongated apex 118 defined between half cones 114. In the illustrated embodiment, semicircular arcs 110, straight portions 112, half cones 114, angled portions 116, elongated apex 118, and back side 96 of front panel 90 cooperate to define dampening chamber 106. Alternatively, acoustic damper 100 and dampening chamber 106 may have any other shape that enables acoustic damper 100 to function as described herein. Specifically, the shape of acoustic damper 100 and dampening chamber 106 may be determined by computation fluid dynamic (CFD) analysis and may be selected based on the fuel-to-air stoichiometry within burner 24, the total mass flow within burner 24, and/or any other operating condition.

As shown in FIGS. 4 and 5, at least one outlet 102 extends through front panel 90 from front side 94 to back side 96. Outlet 102 enables the acoustic pressure oscillations to enter dampening chamber 106 wherein the acoustic pressure oscillations are dampened. In the exemplary embodiment, outlet 102 is a circular conduit extending through front panel 90. Alternatively, outlet 102 may have any other shape that that enables acoustic damper 100 to function as described herein. Specifically, the shape of outlet 102 a may be determined by CFD analysis and may be selected based on the fuel-to-air stoichiometry within burner 24, the total mass flow within burner 24, and/or any other operating condition. Additionally, although the exemplary embodiment only includes a single outlet 102 for each acoustic damper 100, acoustic damper 100 may include any number of outlets 102 that enables acoustic damper 100 to operate as described herein, including, without limitation, two, three, or more outlets 102. Specifically, the number of outlets 102 included with each acoustic damper 100 may be determined by CFD analysis and may be selected based on the fuel-to-air stoichiometry within burner 24, the total mass flow within burner 24, and/or any other operating condition.

Back side 96 of front panel 90 defines at least one cooling air inlet 120 and/or 122. Specifically, in the exemplary embodiment, back side 96 of front panel 90 defines a first cooling air inlet 120 and a second cooling air inlet 122. Cooling air inlets 120 and 122 are oriented to channel a flow of cooling air, as indicated by arrows 124 and 126, into dampening chamber 106. Specifically, first cooling air inlet 120 is oriented to channel a first flow of cooling air, as indicated by arrow 124, and second cooling air inlet 122 is oriented to channel a second flow of cooling air, as indicated by arrow 126. However, acoustic damper 100 may include any other number of Cooling air inlets 120 and 122 that enables acoustic damper 100 to function as described herein, including, without limitation, one, three, or more Cooling air inlets 120 and 122. Specifically, the number of Cooling air inlets 120 and 122 included with each acoustic damper 100 may be determined by CFD analysis and may be selected based on the fuel-to-air stoichiometry within burner 24, the total mass flow within burner 24, and/or any other operating condition. In the exemplary embodiment, the source of flow of cooling air 124 and 126 is compressor section 14, and flow of cooling air 124 and 126 typically has a higher pressure than the combustion gases, such that flow of cooling air 124 and 126 is channeled out of acoustic damper 100 through outlet 102. As such, cooling air inlets 120 and 122 are oriented to channel flow of cooling air 124 and 126 into dampening chamber 106, and outlet 102 is oriented to channel flow of cooling air 124 and 126 from dampening chamber 106.

During operations, burner 24 ignites the fuel-air mixture and generates high temperature combustion gases that are channeled towards turbine section 18. Heat released during combustion combined with the increased pressure caused by combustion may cause acoustic pressure oscillations to develop within burner 24. The acoustic pressure oscillations enter acoustic damper 100 through outlet 102 and are dampened within dampening chamber 106. Heat released during combustion may damage acoustic damper 100, and cooling air inlets 120 and 122 channel cooling air 124 and 126 into acoustic damper 100 to reduce a temperature of acoustic damper 100 and to facilitate reducing damage caused by the heat released during combustion. However, a high velocity of flow of cooling air 124 and 126 within dampening chamber 106 may reduce a pressure within dampening chamber 106, thus enabling hot combustion gases to be drawn into the dampening chamber 106. The hot gases may cause damage to acoustic damper 100.

To facilitate reducing the velocity of flow of cooling air 124 and 126 within dampening chamber 106, at least one baffle 128 is positioned within dampening chamber 106. In the illustrated embodiment, a plurality of baffles 128 are positioned within dampening chamber 106. Baffles 128 extend from back side 96 of front panel 90 within the path of flow of cooling air 124 and 126 to disrupt flow of cooling air 124 and 126 within dampening chamber 106 and to reduce the velocity of flow of cooling air 124 and 126 within dampening chamber 106. As such, baffles 128 reduce the ingestion of combustion gasses into dampening chamber 106 and facilitate reducing damage to acoustic damper 100 caused by the ingestion of combustion gases.

In the illustrated embodiment, baffles 128 are cylindrical projections, or bars, that extend substantially perpendicularly from back side 96. Specifically, each baffle 128 has a baffle height 130 and a baffle diameter 132. However, baffles 128 may have any other shape that enables acoustic damper 100 to function as described herein. Baffle height 130 and baffle diameter 132 are determined by CFD analysis and are selected to disrupt a flow of cooling air 124 and 126 within dampening chamber 106 and to facilitate reducing the velocity of flow of cooling air 124 and 126 within dampening chamber 106. In the exemplary embodiment, each baffle 128 has baffle height 130 of about 4 millimeters (mm) to about 6 mm and baffle diameter 132 of about 1 mm to about 3 mm. However, baffles 128 may have any baffle height 130 and baffle diameter 132 that enables acoustic damper 100 to function as described herein. Additionally, baffles 128 may each have the same baffle height 130 and/or baffle diameter 132, or baffles 128 may each have different baffle heights 130 and/or baffle diameters 132.

In the exemplary embodiment, acoustic damper 100 includes four baffles 128. However, acoustic damper 100 may include any other number of baffles 128 that enables acoustic damper 100 to operate as described herein, including, without limitation, one, two, three, five, or more than four baffles 128. Additionally, each baffle 128 is positioned within acoustic damper 100 such that baffles 128 define a baffle arrangement within acoustic damper 100. Specifically, each baffle 128 is positioned a first distance 134 from first cooling air inlet 120, a second distance 136 from second cooling air inlet 122, and a third distance 138 from outlet 102. Distances 134, 136, and 138 determine the relative position of each baffle 128 within acoustic damper 100, and the position of each baffle 128 determines the baffle arrangement within acoustic damper 100. Specifically, a CFD analysis determines the position of each baffle 128 and the baffle arrangement by adjusting first distance 134, second distance 136, and third distance 138 to disrupt flow of cooling air 124 and 126 within dampening chamber 106 and to reduce the velocity of flow of cooling air 124 and 126 within dampening chamber 106. Additionally, the CFD analysis also simultaneously adjusts baffle height 130 and baffle diameter 132 for each baffle 128 to disrupt flow of cooling air 124 and 126 within dampening chamber 106 and to reduce the velocity of flow of cooling air 124 and 126 within dampening chamber 106.

As shown in FIG. 4, baffles 128 are arranged in a generally linear baffle arrangement within dampening chamber 106. That is, baffles 128 are arranged in a line within dampening chamber 106. As shown in FIG. 5, baffles 128 are arranged in a curved baffle arrangement within dampening chamber 106. Baffles 128 may be arranged in any baffle arrangement that enables acoustic damper 100 to operate as described herein. The baffle arrangement is determined by a CFD analysis that determines which arrangement disrupts flow of cooling air 124 and 126 within dampening chamber 106 and reduces the velocity of flow of cooling air 124 and 126 within dampening chamber 106.

Baffle height 130, baffle diameter 132, first distance 134, second distance 136, and third distance 138 are adjusted for each baffle 128 to determine the baffle arrangement that disrupts flow of cooling air 124 and 126 within dampening chamber 106 and reduces the velocity of flow of cooling air 124 and 126 within dampening chamber 106 in order to reduce ingestion of hot combustion gases into dampening chamber 106 and reduce damage to acoustic damper 100. Specifically, a CFD analysis adjusts baffle height 130, baffle diameter 132, first distance 134, second distance 136, and third distance 138 such that ingestion of hot combustion gases is reduced. Accordingly, baffles 128 described herein reduce ingestion of hot combustion gases into acoustic damper 100, reduce damage to acoustic damper 100, and improve the reliability of burner 24 and rotary machine 10.

Figure 6:
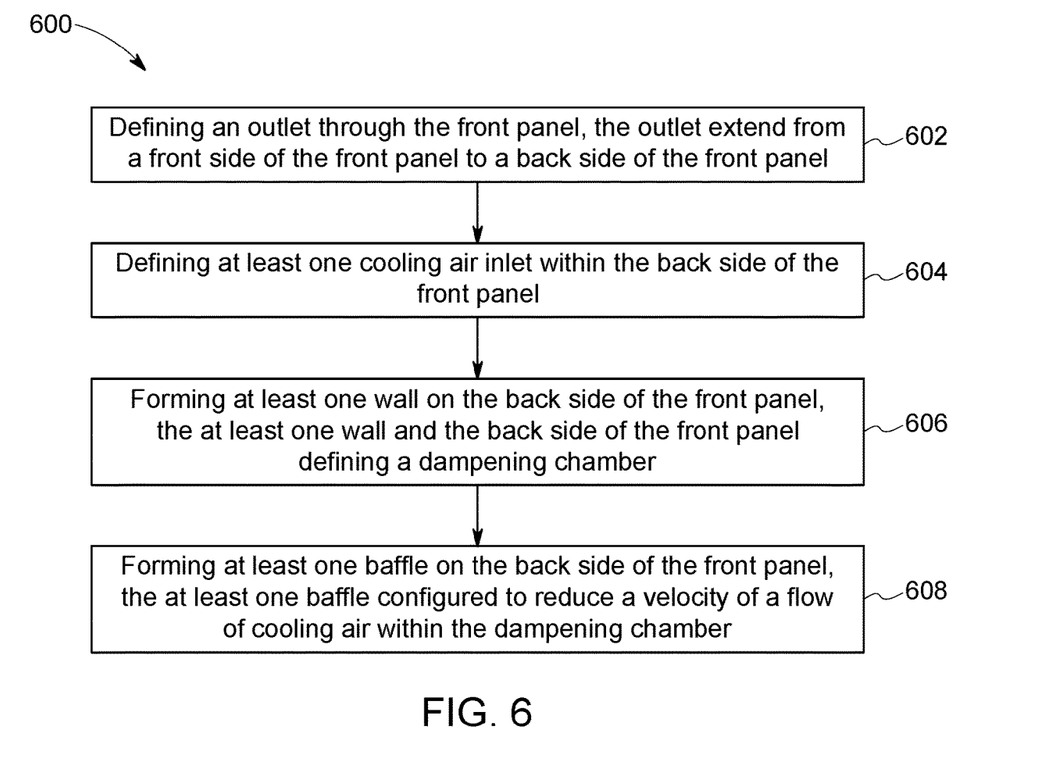
FIG. 6 is a flow diagram of an exemplary method of reducing acoustic oscillations within a rotary machine, such as the rotary machine shown in FIG. 1.

FIG. 6 is a flow diagram of an exemplary embodiment of a method 600 of manufacturing acoustic damper 100. The method 600 includes defining 602 outlet 102 through front panel 90. Outlet 102 extends from front side 94 of front panel 90 to back side 96 of front panel 90. Method 600 also includes defining 604 at least one cooling air inlets 120 and 122 within back side 96 of front panel 90. Method 600 further includes forming 606 at least one wall 104 on back side 96 of front panel 90. Wall 104 and back side 96 of front panel 90 define dampening chamber 106. Method 600 also includes forming 608 at least one baffle 128 on back side 96 of front panel 90. Baffle 128 is oriented to facilitate reducing the velocity of flow of cooling air 124 and 126 within dampening chamber 106.

Acoustic dampers 100 described herein may be manufactured using any manufacturing technique that enables acoustic damper 100 to operate as described herein. In the exemplary embodiment, acoustic damper 100 is manufactured by additively manufacturing acoustic damper 100 and front panel 90. Specifically, front panel 90 is additively manufactured to define outlets 102 and Cooling air inlets 120 and 122 within front panel 90. Acoustic dampers 100 and baffles 128 are then additively manufactured on back side 96 of front panel 90. Additively manufacturing reduces the cost and time to form baffles 128 within acoustic dampers 100. As such, additively manufacturing acoustic damper 100 reduces the cost and manufacturing time to produce acoustic dampers 100 with baffles 128 while increasing the reliability of burner 24 and rotary machine 10.

The exemplary acoustic dampers and methods described herein facilitate reducing a velocity of a cooling stream within the acoustic dampers, reducing acoustic oscillations within a burner, and reducing the ingestion of hot gas into the acoustic damper. The exemplary acoustic dampers described herein include at least one wall extending from a back side of a front panel of a burner. The wall and the back side of the front panel define a dampening chamber. The back side of the front panel also defines at least one cooling air inlet and at least one outlet. The cooling air inlet is oriented to channel a flow of cooling air into the dampening chamber, and the outlet is oriented to channel the flow of cooling air from the dampening chamber. The damper further includes at least one baffle extending from the back side of the front panel and positioned within a flow path of the flow of cooling air.

During operation, the outlet of the acoustic damper enables passage of acoustic oscillations into the acoustic damper, thus dampening the acoustic pressure oscillations and reducing damage to the burner. The flow of cooling air into the dampening chamber cools the acoustic damper and facilitates reducing damage to the acoustic damper. A velocity of the flow of cooling air within the dampening chamber reduces a pressure within the dampening chamber. The reduced pressure may enable hot combustion gases to be ingested or channeled into dampening chamber, potentially causing damage to the acoustic damage. The baffle facilitates reducing the velocity of the flow of cooling air and reducing potential damage to the acoustic damper caused by ingestion of combustion gases.

The methods, apparatus, and systems described herein are not limited to the specific embodiments described herein. For example, components of each apparatus or system and/or steps of each method may be used and/or practiced independently and separately from other components and/or steps described herein. In addition, each component and/or step may also be used and/or practiced with other assemblies and methods.

While the disclosure has been described in terms of various specific embodiments, those skilled in the art will recognize that the disclosure can be practiced with modification within the spirit and scope of the claims. Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

What is claimed is:

1. An acoustic damper for a rotary machine, said acoustic damper comprising:
at least one wall extending from a back side of a front panel, such that a dampening chamber is defined by said at least one wall and said front panel;

at least one cooling air inlet defined within the back side of the front panel, said at least one inlet oriented to channel a flow of cooling air into said dampening chamber;

at least one outlet defined within the back side of the front panel, said at least one outlet oriented to channel the flow of cooling air from said dampening chamber; and at least one cylindrical baffle extending from the back side of the front panel, said at least one cylindrical baffle spaced apart from said at least one cooling air inlet and said at least one outlet and oriented relative to said at least one cooling air inlet to facilitate reducing a velocity of the flow of cooling air within said dampening chamber.

2. The acoustic damper of claim 1, wherein said at least one cooling air inlet comprises at least two cooling air inlets.

3. The acoustic damper of claim 1, wherein said at least one cylindrical baffle has a baffle height of about 4 mm to about 6 mm.

4. The acoustic damper of claim 1, wherein said at least one cylindrical baffle has a baffle diameter of about 1 mm to about 3 mm.

5. The acoustic damper of claim 1, wherein said at least one cylindrical baffle comprises a plurality of baffles.

6. The acoustic damper of claim 5, wherein said plurality of baffles comprises four baffles.

7. The acoustic damper of claim 5, wherein said plurality of baffles are arranged in a linear arrangement.

8. The acoustic damper of claim 1, wherein the at least one cylindrical baffle is spaced a first distance from said at least one cooling air inlet and a second distance from said at least one outlet.

9. A method of manufacturing an acoustic damper for use in a rotary machine, said acoustic damper comprising: at least one wall extending from a back side of a front panel, such that a dampening chamber is defined by said at least one wall and said front panel; at least one cooling air inlet defined within the back side of the front panel, said at least one inlet oriented to channel a flow of cooling air into said dampening chamber; at least one outlet defined with the back side of the front panel, said at least one outlet oriented to channel the flow of cooling air from said dampening chamber; and at least one cylindrical baffle extending from the back side of the front panel, said at least one cylindrical baffle spaced apart from said at least one cooling air inlet and said at least one outlet and oriented relative to said at least one cooling air inlet to facilitate reducing a velocity of the flow of cooling air within the dampening chamber, said method comprising: defining said at least one outlet through the front panel of a burner, wherein said at least one outlet extends from a front side of the front panel to the back side of the front panel; defining said at least one cooling air inlet within the back side of the front panel; forming the at least one wall on the back side of the front panel, and forming said at least one cylindrical baffle on the back side of the front panel.

10. The method of claim 9, wherein forming at least one cylindrical baffle on the back side of the front panel comprises forming a plurality of cylindrical baffles on the back side of the front panel.

11. The method of claim 10, wherein forming the plurality of cylindrical baffles on the back side of the front panel comprises forming four cylindrical baffles on the back side of the front panel.

12. The method of claim 10, wherein forming the plurality of cylindrical baffles on the back side of the front panel comprises forming the plurality of cylindrical baffles in a linear arrangement on the back side of the front panel.

13. The method of claim 10, wherein forming the plurality of cylindrical baffles on the back side of the front panel comprises forming the plurality of cylindrical baffles in a curved arrangement on the back side of the front panel.

14. A rotary machine comprising:

at least one burner comprising a front panel having a front side and an opposing back side; and at least one acoustic damper positioned on said back side of said front panel, said at least one acoustic damper comprising:

at least one wall extending from said back side of said front panel such that a dampening chamber is defined by said at least one wall and said front panel;

at least one cooling air inlet defined within said back side of said front panel, said at least one cooling air inlet oriented to channel a flow of cooling air into said dampening chamber;

at least one outlet defined within said back side of said front panel, said at least one outlet oriented to channel the flow of cooling air from said dampening chamber; and at least one cylindrical baffle extending from said back side of said front panel, said at least one cylindrical baffle spaced apart from said at least one cooling air inlet and said at least one outlet and oriented relative to said at least one cooling air inlet to facilitate reducing a velocity of the flow of cooling air within said dampening chamber.

15. The rotary machine of claim 14, wherein said at least one cooling air inlet comprises at least two cooling air inlets.

16. The rotary machine of claim 14, wherein said at least one cylindrical baffle has a baffle height of about 4 mm to about 6 mm.

17. The rotary machine of claim 14, wherein said at least one cylindrical baffle has a baffle diameter of about 1 mm to about 3 mm.

18. The rotary machine of claim 14, wherein said at least one cylindrical baffle comprises a plurality of cylindrical baffles arranged in a linear arrangement.

19. The rotary machine of claim 14, wherein said at least one cylindrical baffle comprises a plurality of cylindrical baffles arranged in a curved arrangement.

\* \* \* \* \*